(12) United States Patent
Tokuoka

(10) Patent No.: US 9,246,831 B2
(45) Date of Patent: *Jan. 26, 2016

(54) NOC SYSTEM AND INPUT SWITCHING DEVICE

(71) Applicant: Renesas Electronics Corporation, Kawasaki-shi, Kanagawa (JP)

(72) Inventor: Masahiro Tokuoka, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/464,104

(22) Filed: Aug. 20, 2014

(65) Prior Publication Data

US 2014/0355449 A1  Dec. 4, 2014

Related U.S. Application Data

(63) Continuation of application No. 13/277,800, filed on Oct. 20, 2011, now Pat. No. 8,855,112.

(30) Foreign Application Priority Data

Oct. 21, 2010 (JP) .................................. 2010-236052

(51) Int. Cl.
| | |
|---|---|
| *H04L 12/801* | (2013.01) |
| *H04L 12/54* | (2013.01) |
| *H04L 12/933* | (2013.01) |
| *H04L 12/26* | (2006.01) |

(52) U.S. Cl.
CPC ............ *H04L 47/35* (2013.01); *H04L 12/5696* (2013.01); *H04L 43/0882* (2013.01); *H04L 49/109* (2013.01)

(58) Field of Classification Search
CPC ....................................................... H04L 47/35
See application file for complete search history.

(56) References Cited

U.S. PATENT DOCUMENTS

2007/0115995 A1   5/2007   Kim et al.

FOREIGN PATENT DOCUMENTS

JP   2007-115252 A   5/2007

OTHER PUBLICATIONS

Network-on-Chip frontier, Revised Version (Aug. 26, 2008) Internet <http:/www.am.ics.keio.ac.jp/members/matutani/papers/matsutani_kyushu2008.ppt>, pp. 1-75, Keio University.

*Primary Examiner* — Dang Ton
*Assistant Examiner* — Kevin Lee
(74) *Attorney, Agent, or Firm* — Sughrue Mion, PLLC

(57) ABSTRACT

An input switching device is provided between a plurality of functional blocks (NoC routers or IP) connected to a specific router among a plurality of NoC routers of a NoC system and the specific router. The specific router includes a plurality of first buffers that temporarily store flits from the input switching device. A plurality of second buffers in the input switching device correspond to the respective one of the plurality of functional blocks, and temporarily store the flits from the functional block. A controller selectively sets one of the plurality of first buffers as output destination of the flit stored in each of the second buffers based on a free space of the plurality of first buffers. A distributor outputs the flit stored in each of the second buffers to output destination set for the flit by the controller. In this way, throughput degradation of the NoC system can be prevented.

11 Claims, 9 Drawing Sheets

NOC SYSTEM AND INPUT SWITCHING DEVICE

CROSS-REFERENCE TO RELATED APPLICATIONS

This application is a Continuation of U.S. application Ser. No. 13/277,800, filed Oct. 20, 2011, which claims the benefit of priority from Japanese patent application No. 2010-236052, filed on Oct. 21, 2010, the disclosures of which are incorporated herein in their entirety by reference.

BACKGROUND

The present invention relates to routing, and more specifically, to a routing technique in a Network on Chip (NoC) system.

In recent years, the number of Intellectual Properties (IPs) such as processor cores that can be mounted in one chip has been increasing according to miniaturization of semiconductor processes. The increase in the number of IPs complicates lines connecting IPs and increases the number of lines. Under the circumstance, a Network on Chip (NoC) has attracted attention as a connection network in place of a conventional on chip bus ("Network-on-Chip frontier, Revised Version, August 26, Internet <http:/www.am.ics.keio.ac.jp/members/matutani/papers/matsutani_kyushu2008.ppt>" (Non-patent document 1)).

FIG. 5 corresponds to a part of a slide 8 of Non-patent document 1, and shows network topology of a NoC. In FIG. 5, circles indicate NoC routers. In the following description, a "NoC router" may be simply called a "router".

The NoC has various topology of tree type, mesh type, and the like. The mesh type is also called a grid type.

As shown in the upper part of FIG. 5, a plurality of routers are connected in layers in the tree type, where each router in an upper layer is directly connected to each router in a layer immediately below. While the tree type of two layers is shown in the example in the upper part of FIG. 5, any number of layers of the tree may be used. In the description of the present invention, that a functional block A is directly connected to a functional block B means a state in which these two functional blocks are connected so as to be able to transmit and receive data with each other without involving a router. Functional blocks are NoC routers or an Intellectual Property (IP). Although a device called a network interface (NI) is actually provided between the IP and the NoC routers, it is described in this specification that the IP and the NoC routers are directly connected for the sake of convenience. Further, the functional block B directly connected to the functional block A is also called "B next to A" or "B adjacent to A".

As shown in the lower part of FIG. 5, in the mesh type, a plurality of routers are arranged in a lattice shape, and each router is directly connected to other routers on the left, right, up, and down. A hardware configuration of the router of the NoC will be described with reference to the example of the mesh type.

FIG. 6 shows a part of a slide 32 in Non-patent document 1 to which reference symbols are added, and schematically shows a router 10 having five inputs and five outputs. In FIG. 6, "X+", "X−", "Y+", and "Y−" indicate "a right adjacent router of the router 10", "a left adjacent router of the router 10", "a router directly below the router 10", "a router directly above the router 10" (adjacent routers), respectively. In FIG. 6, "CORE" is an IP such as a processor core directly connected to the router 10.

FIG. 7 shows coordinate relations among the router 10 in FIG. 6, CORE, and each of adjacent routers. As shown in FIG. 7, the router 10 is directly connected to CORE and four adjacent routers.

As shown in FIG. 6, the router 10 is connected to CORE and the four adjacent routers by five paths 11, and includes five FIFOs 12, an arbiter (ARBITER in FIG. 6) 14, and an XBAR 16.

The five FIFOs 12 are respectively connected to the five paths 11, and temporarily store packets from the adjacent routers or CORE connected to the paths 11.

The arbiter 14 performs arbitration of output destination of the packet according to the destination of the packet stored in each of the five FIFOs 12. The XBAR 16 has a switching function, and outputs a packet to the output destination according to the arbitration result in the arbiter 14. For example, when the packet for CORE is input from the router of "X+", the packet is temporarily stored in the FIFO 12 corresponding to the router of "X+", and thereafter output to CORE. Further, for example, when the packet for an IP (not shown) directly connected to the router of "Y+" is input from the router of "X+", the packet is temporarily stored in the FIFO 12 corresponding to the router of "X+", and thereafter output to the router of "Y+".

Referring to FIG. 8, a configuration of the packet of the NoC will be described using an example of a signal flow when the packet is transmitted from one IP to another IP.

In the example shown in FIG. 8, an IP 20 is a transmission-side IP, which is a master, and an IP 30 is a reception-side IP, which is a slave. A signal transmitted from the IP 20 is received by the IP 30 by way of a Network Interface (NI) 22, a router 24, a router 26, and an NI 28. Note that another router may be provided between the router 24 and the router 26.

The router 24 is directly connected to the IP 20, and the router 26 is directly connected to the IP 30.

The NI 22 packetizes the signal transmitted from the IP 20 to obtain a plurality of flits, and outputs the flits to the router 24.

The top flit of a plurality of flits obtained by the NI 22 is called a head flit, and includes a control signal unit 42 (Control Signal), a source point 44 (Source), and a destination point 46 (Destination). The source point 44 and the destination point 46 are address information that indicates addresses of the transmission source (IP 20, in this example) and the destination (IP 30, in this example), respectively.

Each flit from the second flit is called a body flit, and includes data indicating the content of the signal. The end flit of the body flit is called a tail flit.

The address information may be included in the second flit (the flit next to the head flit) depending on the bus protocol.

In the following description, a plurality of flits from the head flit to the tail flit obtained by packetizing one signal transmitted from the IP of the transmission source is called one "flit group".

The router 24 sequentially transfers each flit from the NI 22 by time-division multiplexing. More specifically, the router 24 determines the next router from the destination point 46 for each flit group, and sequentially transfers each flit from the head flit to the tail flit to the next router.

Each flit from the router 24 arrives at the router 26 by way of routers provided between the router 24 and the router 26. The router 26 sequentially outputs the flits to the NI 28.

The NI 28 restores a plurality of flits forming one flit group from the router 26 to the signal transmitted or received by the IP to output the restored flits to the IP 30. This restoring processing by the NI 28 is the processing opposite to "packetizing" performed by the NI 22, and hereinafter referred to as "de-packetizing".

In this manner, transmission from the IP 20 as the master to the IP 30 as the slave is achieved.

A variety of suggestions has been made from various points of view regarding the NoC system.

For example, Japanese Unexamined Patent Application Publication No. 2007-115252 discloses a technique for achieving smooth transfer of data when an advanced extensible interface (AXI) which is an interface protocol of IP is applied to the NoC. Description will be made with reference to FIG. 9.

FIG. 9 corresponds to FIG. 2 of Japanese Unexamined Patent Application Publication No. 2007-115252 while the reference symbols are changed, and shows a configuration of a NoC router 50 to which a technique disclosed in Japanese Unexamined Patent Application Publication No. 2007-115252 is applied.

The NoC router 50 includes a switch 53, an arbiter 51, and an interleaving device 80, switches a plurality of pieces of data (flits) transferred from a plurality of AXI masters (IPs), and transmits the plurality of pieces of data (flits) to an AXI slave 70 (IP) through an NI 60.

The arbiter 51 determines the switching order for passing data received at the switch 53. The switch 53 switches the received data according to the switching order determined by the arbiter 51 to transfer the data to the interleaving device 80 one by one. Although not shown in FIG. 9, the switch 53 is considered to have the similar functions as the plurality of FIFOs 12 and the XBAR 16 in FIG. 6 except that the data is output to the interleaving device 80.

The interleaving device 80 includes a classifier 81, a plurality of buffers 83 respectively provided to the plurality of AXI masters, an output unit 85, and an interleaving manager 87.

The classifier 81 classifies data input through the switch 53, and transfers the data to one of the plurality of buffers 83. The classifier 81 classifies the input data by the AXI master that has transmitted the data, and transfers the data to the buffer 83 corresponding to the AXI master.

The output unit 85 retrieves data from one or more buffers 83 selected according to the control of the interleaving manager 87, and outputs the retrieved data so as to be interleaved.

The interleaving manager 87 receives information on the interleaving acceptance capability from the AXI slave 70, and controls the output unit 85 to interleave and provide as many data as corresponding to the interleaving acceptance capability to the AXI slave 70.

The NI 60 de-packetizes data (interleaved data) output from the output unit 85 and outputs this data to the AXI slave 70.

SUMMARY

As will be understood by the description above, the NoC system includes buffers in a router, each buffer corresponding to the path performing transfer of the flit, or the IP and the router directly connected to the router. These buffers temporarily store flits from the routers or the IP corresponding to themselves.

Accordingly, when flits are successively input through one path and the buffer corresponding to the path becomes full, the router cannot receive subsequent flits from the same path until when there is generated a free space in the buffer. This causes throughput degradation in the NoC system, which causes a problem of a so-called "Head of Line Blocking Problem".

One aspect of the present invention is a NoC system including a plurality of NoC routers performing transfer of flits. Each of the NoC routers is directly connected to a plurality of functional blocks. The functional blocks are NoC routers other than the NoC router or an Intellectual Property (IP).

At least one NoC router is a specific router. The "specific router" is a router including an input switching device provided between the router and a plurality of functional blocks directly connected to the router, and includes a plurality of first buffers and a transfer unit.

The plurality of first buffers temporarily store the flits from the input switching device. The transfer unit transfers the flits temporarily stored in the plurality of first buffers to a functional block which is the transfer destination of the flits among the plurality of functional blocks.

The input switching device includes a plurality of second buffers, a controller, and a distribution unit.

The plurality of second buffers correspond to the respective one of the plurality of functional blocks, and temporarily store the flits from the functional blocks.

The controller selectively sets one of the plurality of first buffers as output destination of flits stored in the plurality of second buffers based on a free space of the plurality of first buffers in the specific router.

The distribution unit outputs the flits stored in the plurality of second buffers to the output destination set for the flit by the controller.

Note that the system of the above aspect replaced by a method or a device, an input switching device included in the system of the above aspect, a switching method by the input switching device, or the like is also effective as an aspect of the present invention.

The technique of the present invention is capable of preventing throughput degradation in a NoC system.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
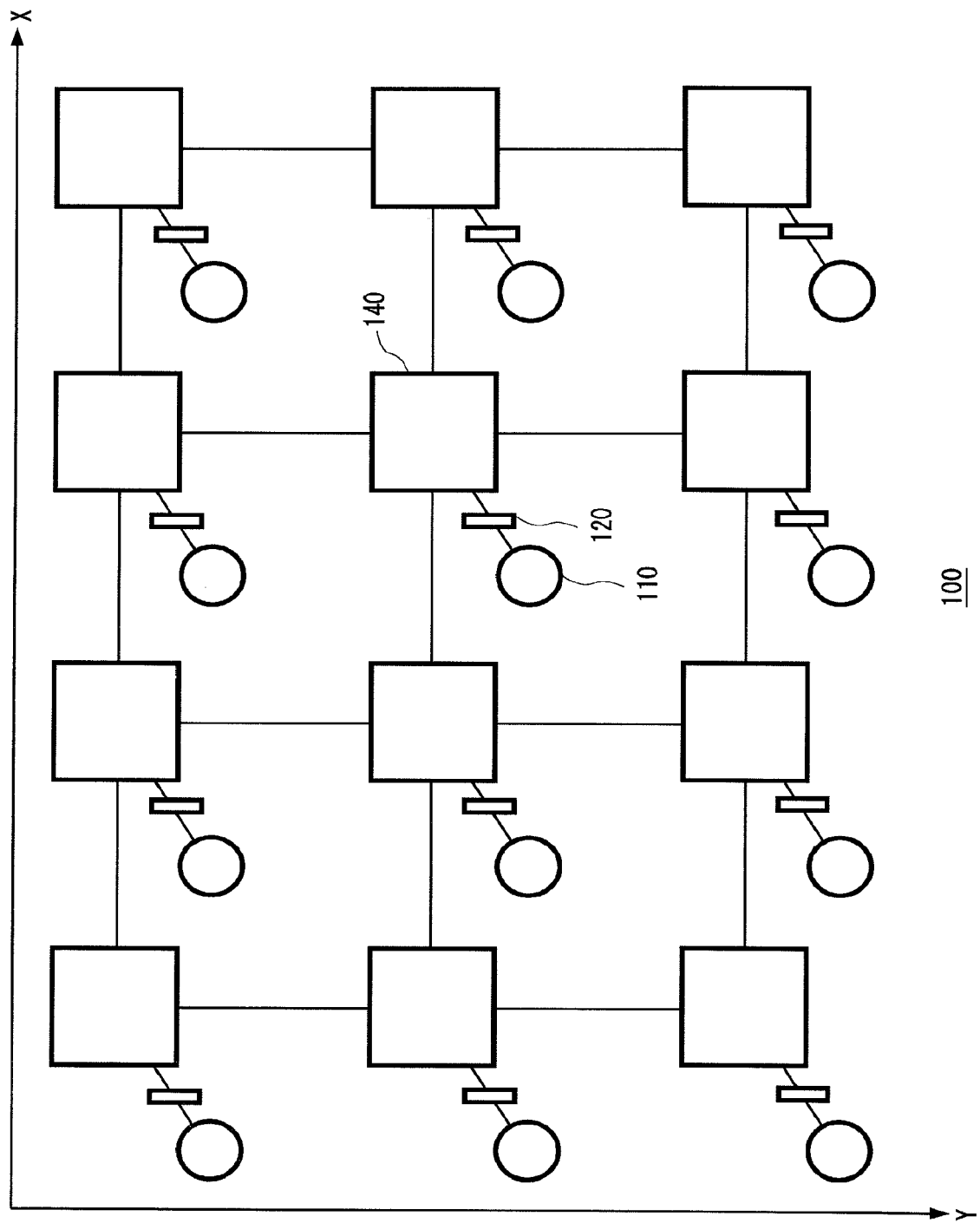
FIG. 1 shows a NoC system according to an exemplary embodiment of the present invention.

Hereinafter, an exemplary embodiment of the present invention will be described with reference to the drawings. For the sake of clarification of explanation, a part of the following description and drawings are omitted or simplified as appropriate. Further, each element shown in the drawings as a functional block performing various processing can be achieved by a CPU, a memory, and other circuits in hardware, and can be achieved by a program loaded to a memory, for example, in software. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

FIG. 1 shows a NoC system 100 according to an exemplary embodiment of the present invention. In FIG. 1, circles (110) indicate IPs such as processor cores, small rectangles (120) indicate Network Interfaces (NIs), and large rectangles (140) indicate transfer devices.

The NI 120 is provided between the IP 110 and the transfer device 140 directly connected with each other, and includes a "packetizing" function and a "de-packetizing" function. More specifically, the NI 120 packetizes a signal output from the IP 110 to obtain flits, outputs the obtained flits to the transfer device 140 directly connected to the IP 110, de-packetizes the flits from the transfer device 140 to the IP 110 to bring the flits back to the signal, and outputs the signal to the IP 110. As described above, the state of "directly connected" means two devices are connected so as to be able to transmit and receive data without involving a NoC router.

The details of the transfer device 140 will be described later. Each of transfer devices 140 includes a NoC router that transfers flits. The NoC system 100 according to the exemplary embodiment is a mesh-type NoC system, and NoC routers are connected in a lattice shape. Each of the NoC routers is directly connected to a plurality of functional blocks, and the functional blocks include IP or other NoC routers. The NoC routers among the functional blocks are also called a router directly above the corresponding router, a router directly below the corresponding router, a left adjacent router, and a right adjacent router.

Shown in FIG. 1 is an example in which one IP 110 is directly connected to each transfer device 140, or to each NoC router. However, it is not necessary that the IP is connected to the transfer device 140. Further, the number of IPs that is connected to the transfer device 140 is not limited to one.

Figure 2:
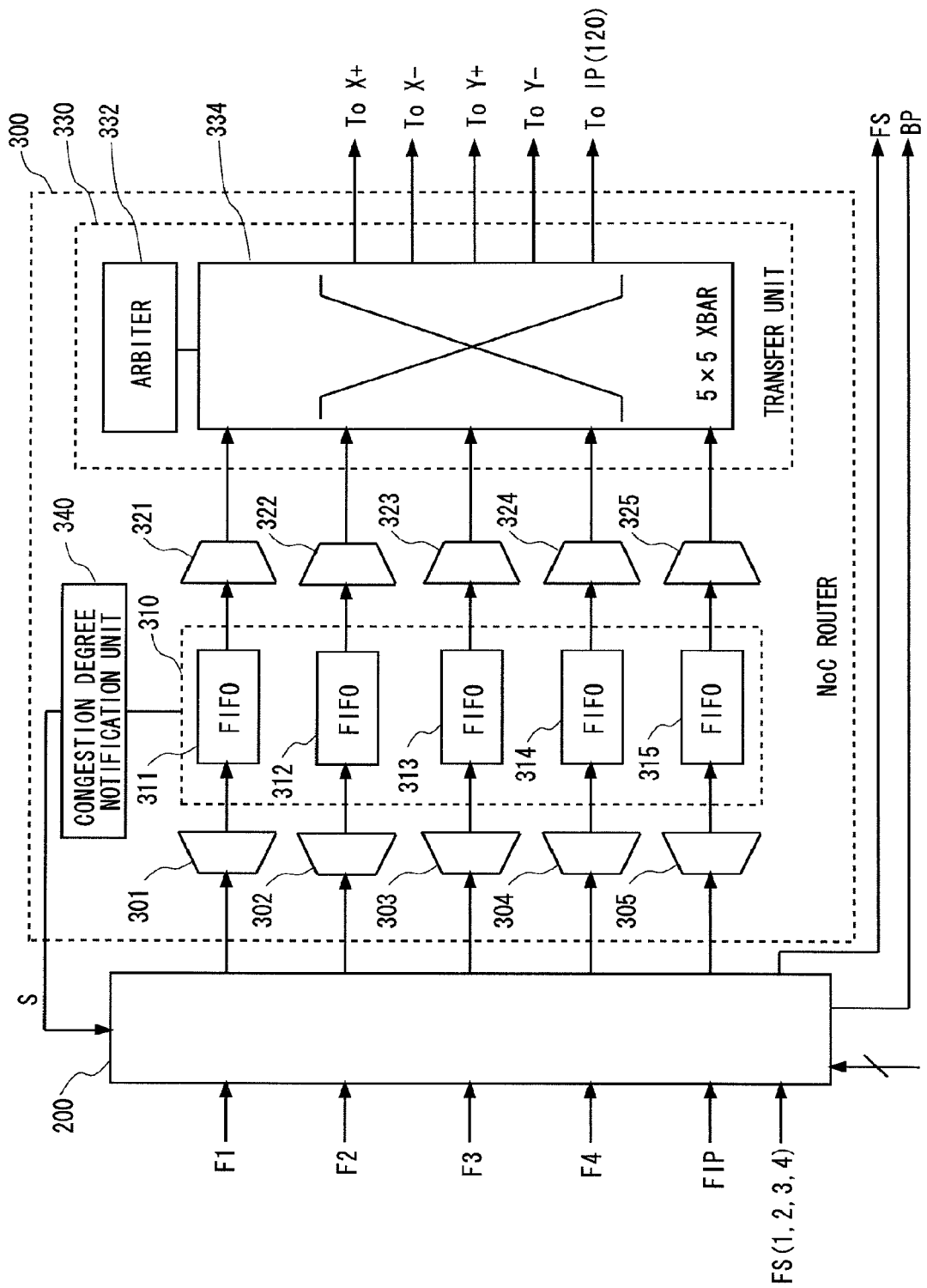
FIG. 2 shows a transfer device in the NoC system shown in FIG. 1.

FIG. 2 shows a configuration of the transfer device 140. For the sake of clarification, FIG. 2 separately shows a side in which flits are input and a side in which flits are output of the transfer device 140.

The transfer device 140 includes an input switching device 200 and a NoC router 300. Flits (F1, F2, F3, F4, and FIP) that are input to the transfer device 140 from each of the functional blocks (four NoC routers on the left, right, up, and down, and an IP) directly connected to the NoC router 300 are input to the input switching device 200 first. Note that F1, F2, F3, and F4 are output from a right adjacent router (X+), a left adjacent router (X−), a router directly below the corresponding router (Y+), and a router directly above the corresponding router (Y−), respectively, and the FIP is a flit from the IP 110 through the NI 120.

The NoC router 300 is similar to a typical NoC router except that the input switching device 200 is provided between the NoC router 300 and the plurality of functional blocks directly connected to the NoC router 300, and the NoC router 300 includes a congestion degree notification unit 340 that will be described later. Such a NoC router is also referred to as a "specific router" here in below. Further, for the sake of convenience of description, the input switching device 200 that is provided between the NoC router 300 and each of the functional blocks directly connected to the NoC router 300 is referred to as "the input switching device 200 of the NoC router 300".

In the NoC system 100 according to the exemplary embodiment, as an example, all the NoC routers 300 are specific routers, and the input switching devices 200 of the adjacent NoC routers 300 are further directly connected to each other and are capable of transmitting and receiving data with each other without involving the NoC router 300.

A flit FS(1, 2, 3, 4) is also input to the input switching device 200, which is the flit input from the input switching devices 200 of four NoC routers on the left, right, up, and down of the NoC router 300.

The input switching device 200 outputs the input flits (F1, F2, F3, F4, FIP, FS) to the NoC router 300, and the NoC router 300 outputs the flits from the input switching device 200 to the functional block which is the transfer destination of the flits among five functional blocks including four adjacent routers on the left, right, up, and down, and the IP 110.

The input switching device 200 may output the flits to any one of the input switching devices 200 of the four adjacent routers on the left, right, up, and down instead of outputting it to the NoC router 300. The flits thus output are input to the input switching device 200 of the output destination as the flit FS.

The NoC router 300 includes five input ports 301 to 305 connected to the input switching device 200, a buffering unit 310 connected to the five input ports 301 to 305, five output ports 321 to 325 connected to the buffering unit 310, a transfer unit 330 connected to the output ports 321 to 325, and a congestion degree notification unit 340.

The buffering unit 310 includes five first buffers (FIFOs) 311 to 315 connected to the input ports 301 to 305, respectively, and output sides of the FIFOs 311 to 315 are connected to the output ports 321 to 325, respectively. The transfer unit 330 includes an ARBITER 332 and an XBAR 334.

The input ports 301 to 305, the buffering unit 310, the output ports 321 to 325, and the transfer unit 330 are similar to those included in the typical NoC router. A brief description will be given here.

The input ports 301 to 305 output the flits received from the input switching device 200 to the FIFOs connected thereto in the buffering unit 310. The FIFOs 311 to 315 temporarily store the flits. The output ports 321 to 325 output the flits temporarily stored in the FIFOs 311 to 315 to the XBAR 334.

The XBAR 334 outputs the flits from the output ports 321 to 325 to the functional block that is the transfer destination of the flits among five functional blocks including four adjacent routers on the left, right, up, and down, and the IP 110 according to the control by the ARBITER 332.

The congestion degree notification unit 340 outputs congestion degree information S that can indicate a free space of each of first buffers (FIFOs 311 to 315) in the buffering unit 310 to the input switching device 200. This congestion degree information S may have any form as long as it can indicate a free space of each of the FIFOs 311 to 315. For example, in the exemplary embodiment, each of the FIFOs 311 to 315 includes a plurality of stages, and has a structure in which one flit is stored for one stage. The congestion degree information S is information indicating the number of stages having space of each of the FIFOs 311 to 315.

With referring to FIG. 3, the input switching device 200 will be described in detail.

Figure 3:
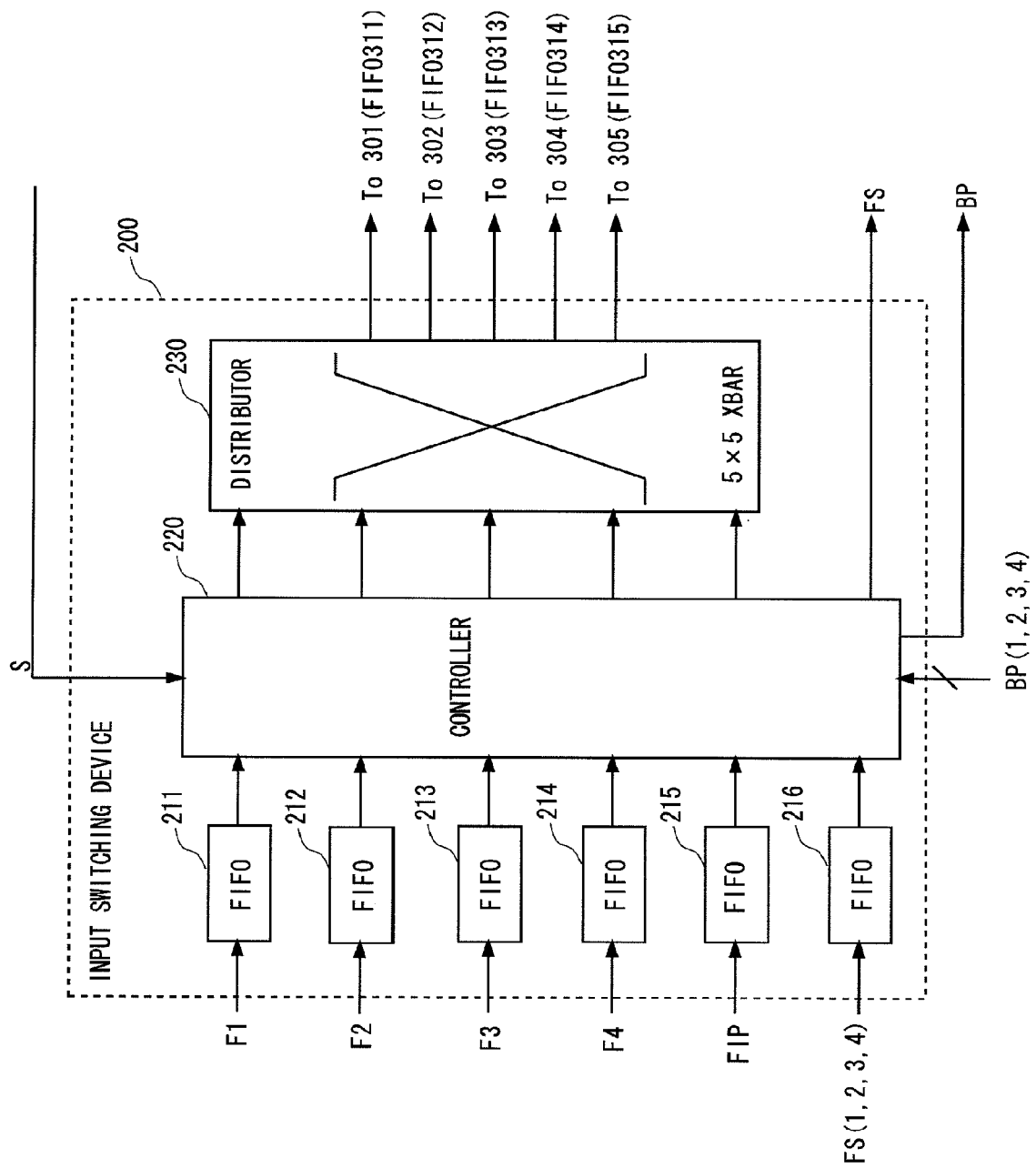
FIG. 3 shows an input switching device in the transfer device shown in FIG. 2.

As shown in FIG. 3, the input switching device 200 includes six second buffers (FIFOs 211 to 216, in this example), a controller 220, and a distributor 230.

The FIFOs 211 to 215 correspond to NoC routers on the left, right, up, and down, and the IP 110, and temporarily store the flits (F1, F2, F3, F4, FIP) from these functional blocks. The FIFO 216 temporarily stores the flit FS from another input switching device 200 connected to the input switching device 200.

In a default state, the flits stored in the FIFOs 211 to 215 are set so as to be output to the FIFOs 311 to 315 in the NoC router 300, respectively, and the flit stored in the FIFO 216 is set so as to be output to one of the FIFOs 311 to 315, e.g., the FIFO 311.

The controller 220 sets the output destination of the flits stored in the FIFOs 211 to 216. The output destination of each flit stored in the FIFOs 211 to 216 is one of the input ports 301 to 305 in the NoC router 300, or any one of the input switching devices 200 of the four routers on the left, right, up, and down. Further, the controller 220 may transmit a rejection signal BP to the input switching devices 200 of the four routers on the left, right, up, and down. The output destination is set based on the congestion degree information S from the NoC router 300 and the rejection signal BP from the input switching device 200 of the four routers on the left, right, up, and down, and the rejection signal BP is transmitted based on the congestion degree information S from the NoC router 300.

The controller 220 determines whether there is a FIFO having a free space equal to or larger than a first threshold value among each of the first buffers (FIFOs 311 to 315) of the NoC router 300 and there is another FIFO having a free space equal to or smaller than the first threshold value and equal to or larger than a second threshold value. When this determination condition is satisfied, the controller 220 sets the input port of a FIFO having a free space equal to or larger than the first threshold value among the FIFOs 311 to 315 as the output destination of the flit. In other words, when there are a plurality of FIFOs having a free space equal to or larger than the second threshold value among the FIFOs 311 to 315 and there is a FIFO having a free space equal to or larger than the first threshold value among the plurality of FIFOs, the FIFO having the free space equal to or larger than the first threshold value is set as the output destination of the flit.

The first threshold value and the second threshold value may be predetermined values. For example, when each of the first buffers (FIFOs 311 to 315) is a four-stage FIFO, the first threshold value and the second threshold value can be "two stages" and "one stage", respectively, or "two stages" and "two stages", respectively.

When the above determination condition is not satisfied, the controller 220 outputs the rejection signal BP (back pressure) indicating that it does not receive any input of the flit to the input switching device 200 of each of the adjacent routers. After that, the controller 220 sets the input switching device 200 that does not output the rejection signal BP among the input switching devices 200 of the adjacent routers as the output destination of each flit input to the controller 220, and directly outputs the flit to the input switching device 200 without involving the NoC router 300.

The distributor 230 serves as a switch controlled by the controller 220, and outputs the flits from the controller 220 to any of the output destination set by the controller 220 (any of the input ports 301 to 305 of the NoC router 300, substantially one of the FIFOs 311 to 315).

Figure 4:
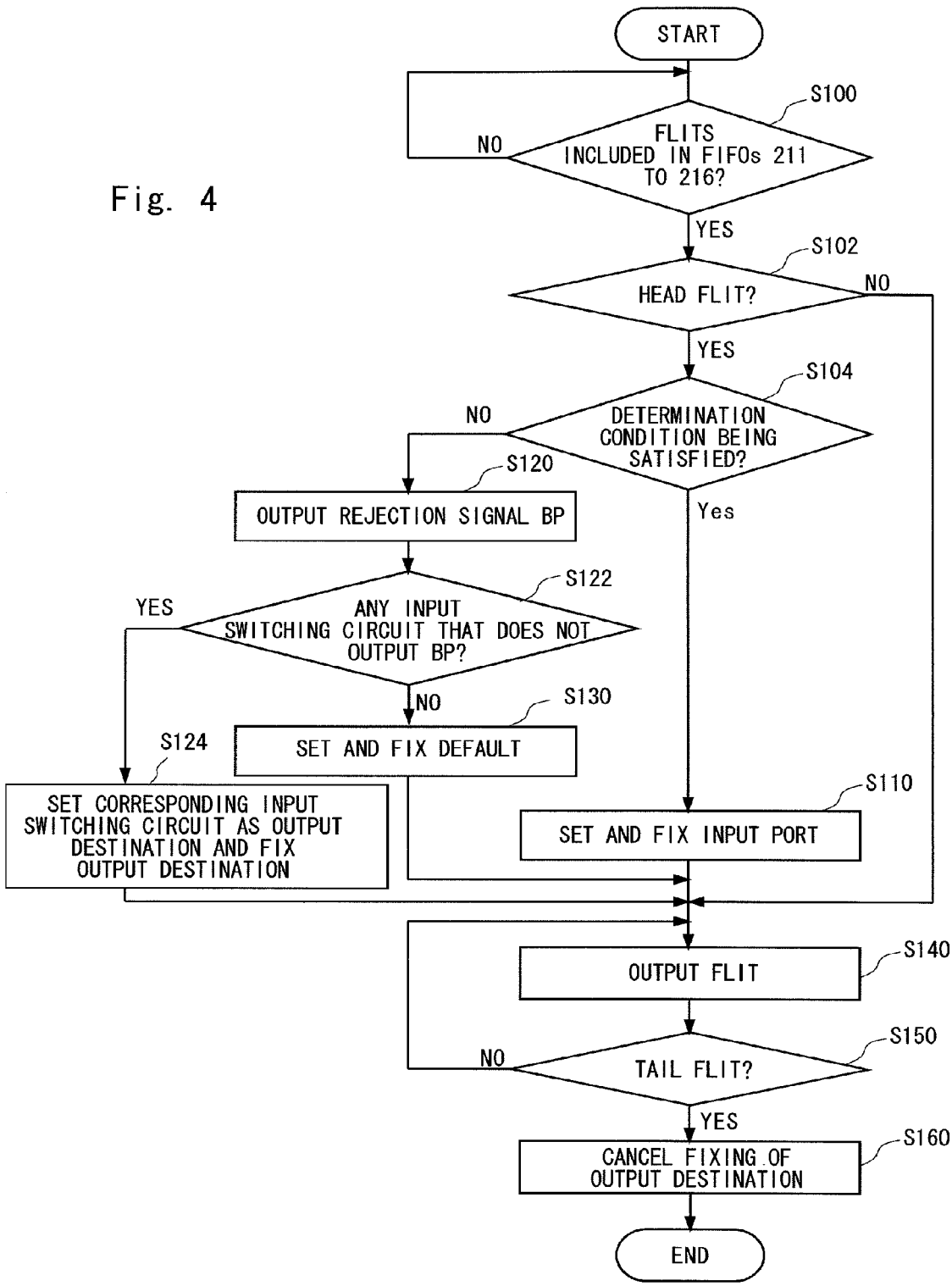
FIG. 4 is a flowchart showing a process flow in the input switching device shown in FIG. 3.
Figure 5:
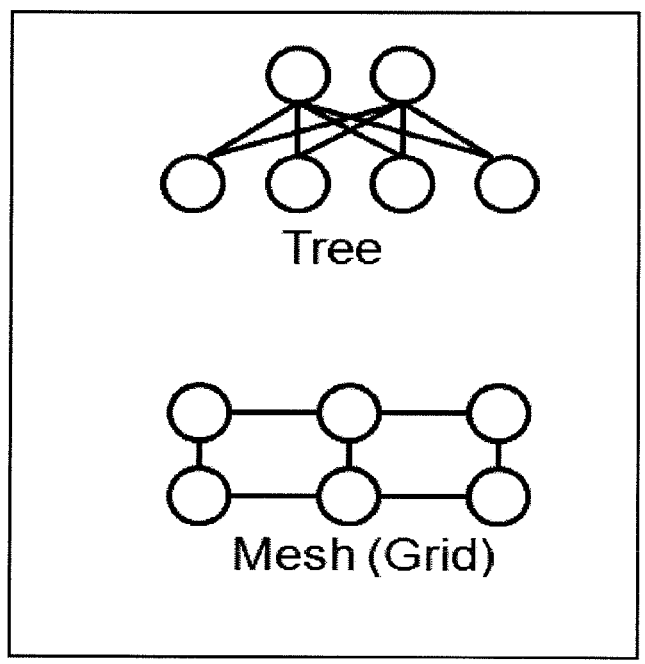
FIG. 5 is a diagram for explaining network topology of a NoC.
Figure 6:
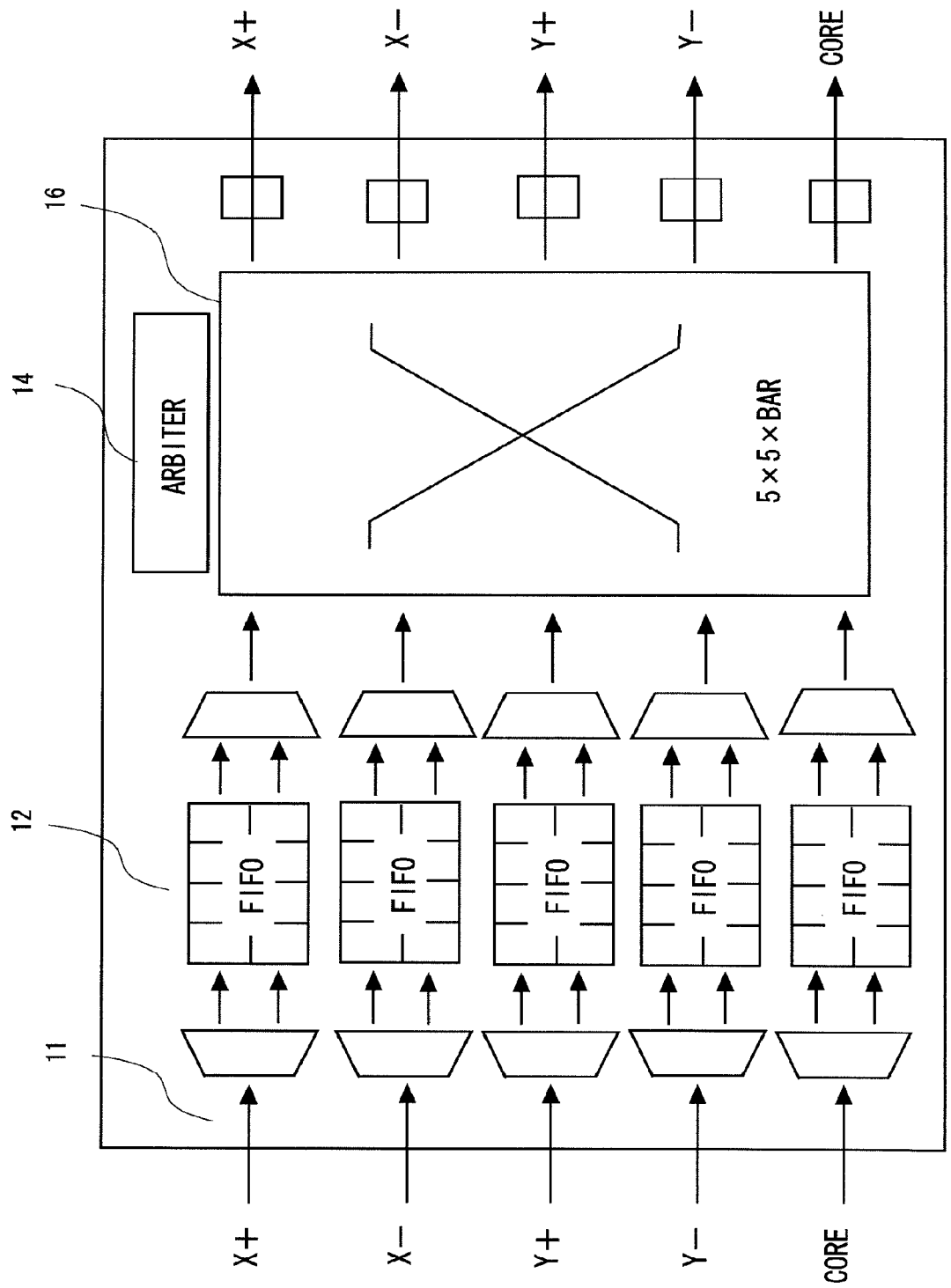
FIG. 6 is a diagram for explaining a hardware configuration of a NoC router.
Figure 7:
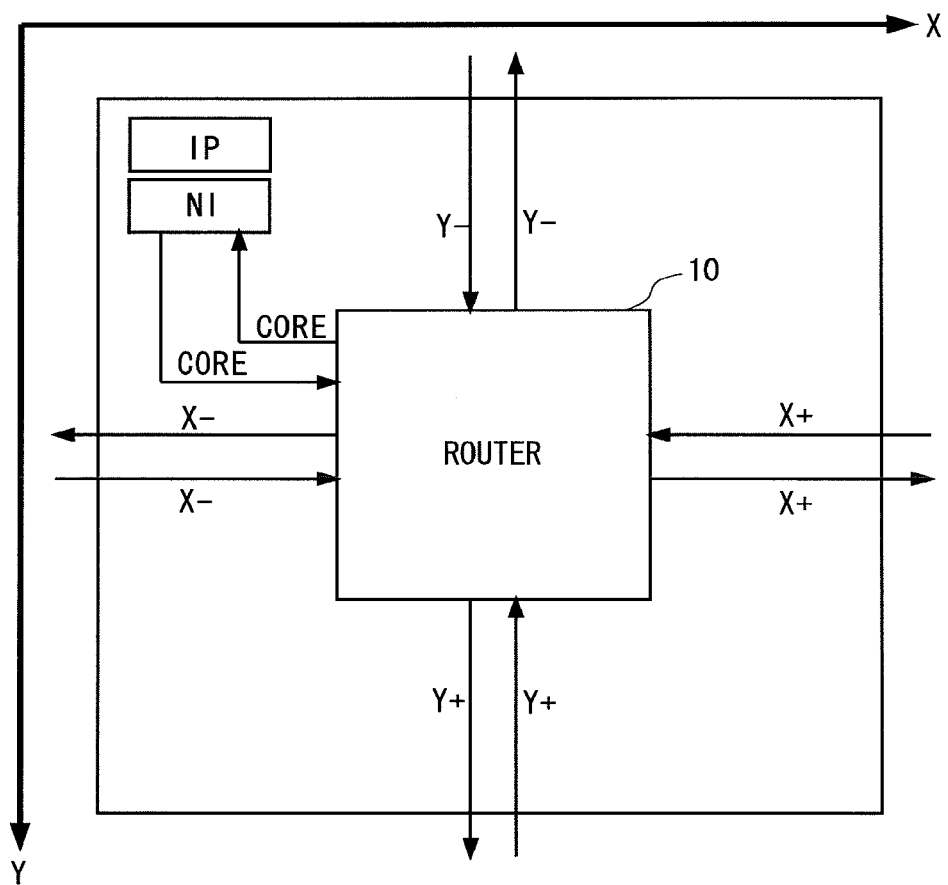
FIG. 7 is a diagram for explaining a coordinate relation of the router shown in FIG. 6 and other functional blocks.
Figure 8:
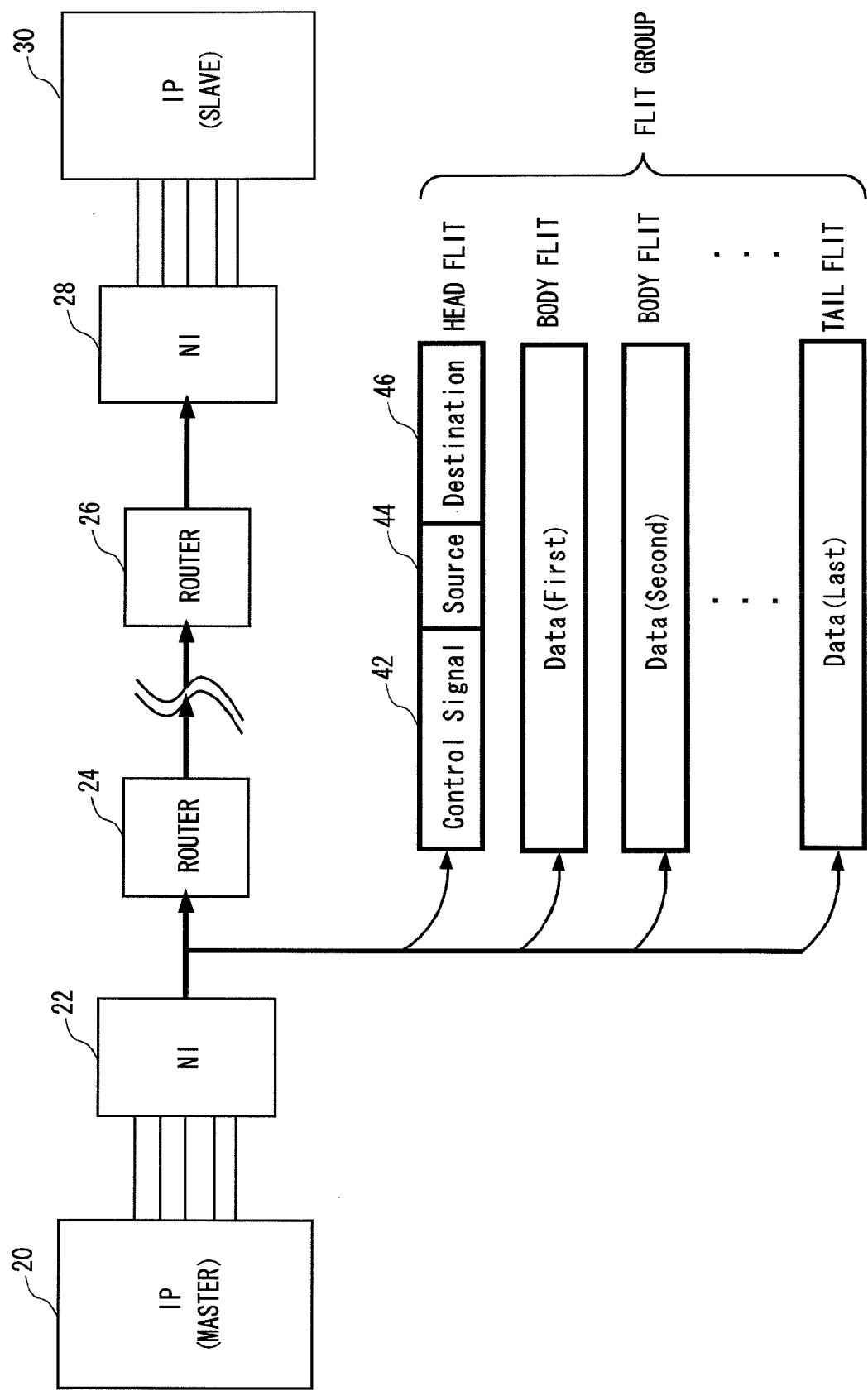
FIG. 8 is a diagram for explaining a packet configuration of the NoC.
Figure 9:
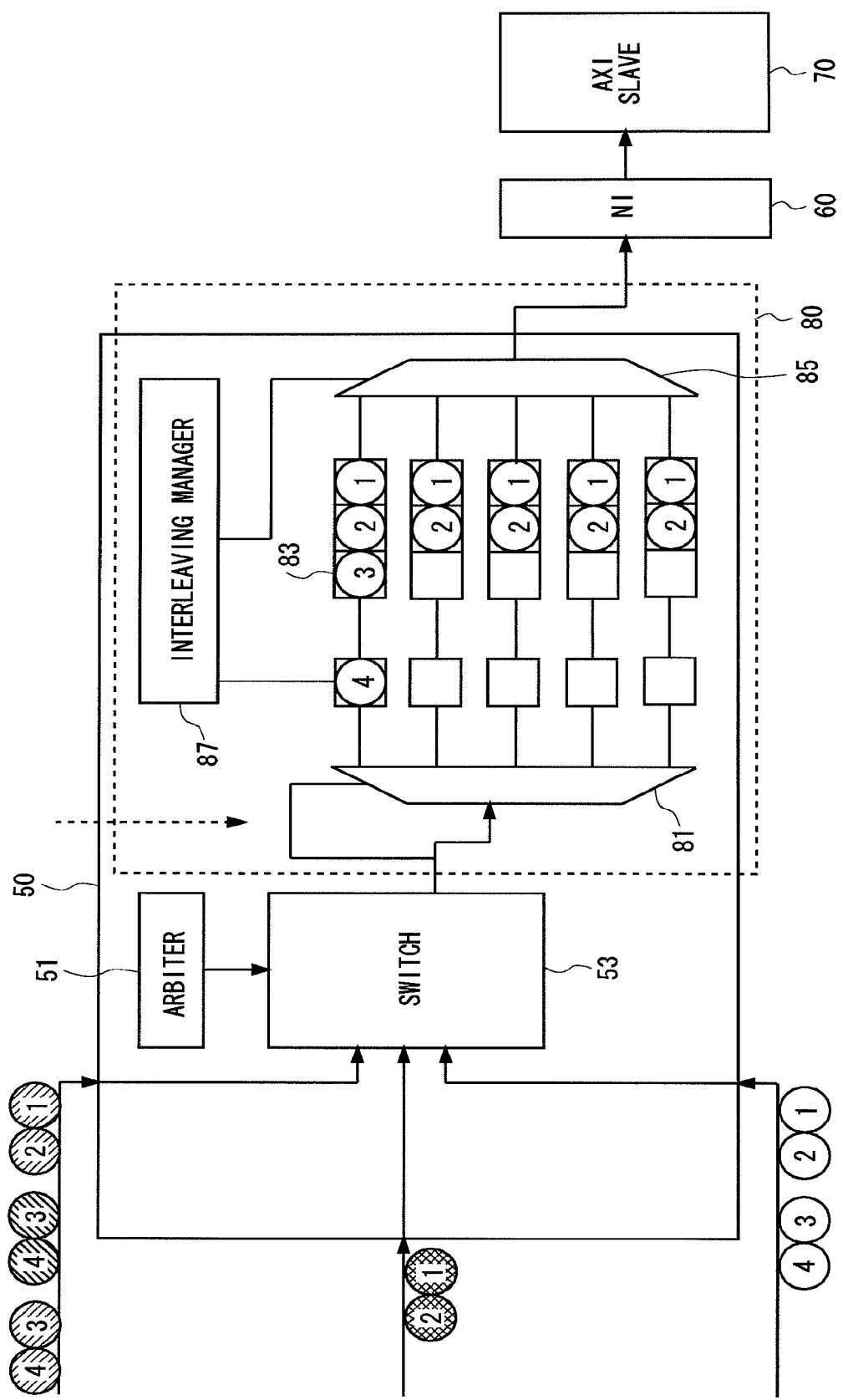
FIG. 9 is a diagram for explaining a related art.

With reference to FIG. 4, an operation of the input switching device 200 will be described further in detail.

FIG. 4 is a flowchart showing a process flow in the input switching device 200. The controller 220 of the input switching device 200 checks whether flits are stored in the FIFOs 211 to 216. When there are no FIFOs that store the flits, it is required to wait until a flit is input (S100: No, S100~).

As described above, the FIFOs 211 to 215 of the input switching device 200 receive the flits (F1 to F4, FIP) from the four adjacent routers on the left, right, up, and down, and the IP 110, and the FIFO 216 receives the flit (FS) from the input switching devices 200 of the four adjacent routers on the left, right, up, and down. When any of the FIFOs receives a flit, the controller 220 checks whether the flit is a head flit (S100: Yes, S102).

When it is determined in step S102 that the flit is the head flit, the input switching device 200 acquires the congestion degree information S from the NoC router 300, more specifically, from the congestion degree notification unit 340, to check whether the determination condition is satisfied (S102: Yes, S104).

The determination condition is that, as already described above, "there are a plurality of FIFOs having a free space equal to or larger than the second threshold value (at least one stage) among the FIFOs 311 to 315 and at least one FIFO among the plurality of FIFOs has a free space equal to or larger than the first threshold value (e.g., two stages)".

When the determination condition is satisfied, the controller 220 sets the input port of the FIFO having a free space equal to or larger than the first threshold value among the FIFOs 311 to 315 as the output destination of the flit that is stored in one of the FIFOs 211 to 216, and fixes the output destination (S104: Yes, S110). The term "fixes" means to keep the output destination of the following flits to the tail flit corresponding to the head flit input in step S102 stored in the corresponding FIFO of the FIFOs 211 to 216 to the output destination set for the head flit. It is assumed, for example, that the head flit is stored in the FIFO 211, and the controller 220 sets the input port 301 as the output destination of the head flit based on the congestion degree information S from the congestion degree notification unit 340 of the NoC router 300. After that, the output destination of the following flits to the tail flit stored in the FIFO 211 is fixed to the input port 301.

When the determination condition is satisfied in step S104 and there are a plurality of FIFOs having a free space equal to or larger than the first threshold value in the FIFOs 311 to 315, the controller 220 sets the input port of any one of the plurality of FIFOs, or the input port of the FIFO having the largest free space as the output destination. Alternatively, when a default set FIFO is included in the FIFO having a free space equal to or larger than the first threshold value, the input port of the default set FIFO is set as the output destination. When the default set FIFO is not included, the input port of the FIFO having the largest free space may be set as the output destination.

For example, when the head flit is stored in the FIFO 211 and each of the FIFO 311, the FIFO 312, and the FIFO 313 has the free space equal to or larger than the first threshold value, the controller 220 may either set any one input port of the FIFO 311, the FIFO 312, and the FIFO 313 as the output destination of the head flit, or set the input port of the FIFO having the largest free space among the FIFO 311, the FIFO 312, and the FIFO 313 as the output destination of the head flit. Alternatively, the controller 220 may set the input port 301 of the FIFO 311 which is the initial output destination of the FIFO 211 as the output destination.

When the determination condition is not satisfied in step S104, the controller 220 outputs the rejection signal BP to the four adjacent routers on the left, right, up, and down (activates the rejection signal BP), and checks whether there is an input switching device 200 that does not output the rejection signal BP among the input switching devices 200 of the four adjacent routers on the left, right, up, and down (S104: No, S120, S122).

When there is an input switching device 200 that does not output the rejection signal BP among the input switching devices 200 of the four adjacent routers on the left, right, up, and down, the controller 220 sets the input switching device 200 as the output destination, and fixes the output destination (S122: Yes, S124).

On the other hand, when the rejection signal BP is output from each of the input switching devices 200 of the four adjacent routers on the left, right, up, and down in step S122 (S122: No), the controller 220 sets, for the corresponding buffer among the FIFO 211 to FIFO 216, the default input port of the buffer among the input ports 301 to 305 as the output destination, and fixes the output destination (S130).

Assume that the head flit is stored in the FIFO 211, for example. When each of the free space of the FIFO 311 to FIFO 315 is smaller than the first threshold value, and only the input switching device 200 of the router directly above the corresponding router among the four adjacent routers on the left, right, up, and down does not output the rejection signal BP, the controller 220 sets, for the FIFO 211, the input switching device 200 just above the corresponding router as the output destination.

On the other hand, when each of the free space of the FIFO 311 to FIFO 315 is smaller than the first threshold value, and each of the input switching devices 200 of the four adjacent routers on the left, right, up, and down outputs the rejection signals BP when the head flit is stored in the FIFO 211, the controller 220 sets, for the FIFO 211, the default set input port 301 as the output destination.

In this way, when the head flit is stored in any of the FIFOs 211 to 216, the controller 220 sets the output destination of the head flit based on the congestion degree of the FIFOs 311 to 315 indicated by the congestion degree information S from the NoC router 300, and the presence or absence of the rejection signal BP from the input switching devices 200 of the adjacent NoC routers on the left, right, up, and down (S110, S124, S130).

In step S140, the flits stored in the FIFOs 211 to 216 are output. More specifically, the controller 220 outputs the flits to the distributor 230 when any of the input ports 301 to 305 are set as the output destination (S110 or S130). The distributor 230 outputs the flits from the controller 220 to the input port set by the controller 220. On the other hand, when any of the input switching devices 200 of the four adjacent routers on the left, right, up, and down is set as the output destination, the controller 220 outputs the flits to the input switching device 200 of the output destination that is set (S140).

Possibly, when the operation moves from step S130 to step S140, the buffer corresponding to the input port of the output destination may not have a free space and cannot receive the flit. In this case, it is required to wait until when there is generated a free space in the buffer before outputting the flits.

After that, the following flits to the tail flit stored in the buffers of the FIFO 211 to FIFO 216 are output to the output destination set in steps S110, S124, and S130 (S102: No, S140, S150: No, S140~).

When the tail flit is output from the buffer of the FIFOs 211 to 216, the controller 220 cancels fixing of the output destination set for the buffer (S160).

After that, every time the flit is input to the input switching device 200, processing from step S102 is repeated.

In the NoC system 100 according to the exemplary embodiment, each of the NoC routers 300 is a specific router including the input switching device 200 provided between the NoC router 300 and the plurality of functional blocks (another NoC router 300 or IP 110) directly connected to the NoC router 300. The output destination of each functional block directly connected to the NoC router 300 can be selectively set to the FIFOs 311 to 315 based on the congestion degree information S from the NoC router 300 indicating a free space in the plurality of second buffers (FIFOs 311 to 315) in the NoC router 300. Although the FIFOs 211 to 215 in the input switching device 200 have a one-to-one relation with the plurality of functional blocks directly connected to the NoC router 300, the FIFOs 311 to 315 in the NoC router 300 does not have a one-to-one relation with the plurality of functional blocks. Thus, the amount of flits stored in the FIFOs 311 to 315 can be dispersed. Accordingly, the problem of "Head of Line Blocking Problem" can be mitigated, and the throughput degradation of the NoC system can be prevented.

Further, in the NoC system 100 of the exemplary embodiment, after the output destination of the head flit is set, the output destination of the following flits to the tail flit corresponding to the head flit is fixed, which ensures that each flit that belongs to the same flit group is output to the same buffer of the router.

Further, in the NoC system 100 of the exemplary embodiment, when the FIFOs 311 to 315 of the NoC router 300 connected to the input switching device 200 do not satisfy the determination condition stated above, the input switching device 200 outputs the rejection signal BP to the input switching device 200 of another NoC router 300 directly connected to the NoC router 300, and outputs the flits stored in the FIFOs 211 to 216 to the input switching device 200 that does not output the rejection signal BP among the input switching devices 200 of other NoC routers 300. Accordingly, when the congestion occurs in the FIFOs 311 to 315 of the NoC router 300 connected to the input switching device 200 and the FIFOs 311 to 315 cannot receive the following flits, the following flits may be output and transferred to the input switching device 200 of another NoC router 300 directly connected to the NoC router 300. Accordingly, the load of the transfer can be dispersed among adjacent NoC routers, and throughput of the NoC system can further be improved.

Furthermore, in the NoC system 100 of the exemplary embodiment, the controller 220 of the input switching device 200 determines whether to output the flit stored in the buffer (FIFOs 211 to 216) to the NoC router 300 connected to itself or to another input switching device 200 according to the following determination condition. The determination condition is that one of the FIFOs 311 to 315 of the NoC router 300 has a "buffer having a free space equal to or larger than the first threshold value" and a "buffer having a free space equal to or larger than the second threshold value and equal to or smaller than the first threshold value". Accordingly, when each buffer except one buffer, e.g., the FIFO 311, is congested among the FIFOs 311 to 315, the state in which the flits are concentrated and output to the FIFO 311 can be prevented.

The present invention has been described with reference to the exemplary embodiment. It should be noted that the exemplary embodiment is merely an example, and may be variously changed or modified without departing from the spirit of the present invention. A person skilled in the art should understand that the variant example after the change or modification is also within the scope of the present invention.

For example, in the NoC system 100 of the exemplary embodiment, all the NoC routers 300 are specific routers. However, only a part of the NoC routers included in the NoC system may be set as a specific router.

More specifically, for example, in the NoC system, only the NoC router in a plane having large variation of amount of flits from the plurality of functional blocks that are directly connected to the NoC router may be set to the specific router. In this case, the input switching device of the specific router selectively sets the output destination of the flits from each functional block directly connected to the specific router as one of the plurality of buffers included in the specific router according to the congestion degree information S of the specific router. Accordingly, the amount of flits stored in the plurality of buffers of the specific router is dispersed, which can prevent throughput degradation due to the concentrated output of flits only to one buffer.

Further, when a plurality of other specific routers are included in functional blocks directly connected to one specific router, the input switching device of the specific router can be connected only to the input switching device of a part of the router of the plurality of other specific routers. In this case, the input switching device of the specific router may select the output destination of the flits from the input switching device of the part of the router when it is required to output the flits to another input switching device.

Needless to say, it may be possible to set, for the input switching device of each specific router, only one of the other input switching devices as the output destination regardless of the number of other input switching devices connected to the corresponding input switching device when it is required to output flits to another input switching device.

Further, while the number of buffers (FIFO 311 and the like) included in the specific router is equal to the number of functional blocks directly connected to the specific router in the NoC system 100 according to the exemplary embodiment, the number of buffers included in the specific router may be set to any number of two or more.

Further, while the input switching device 200 only includes the FIFO 216 as a buffer that stores flits from other input switching devices in the NoC system 100, the input switching device 200 may include buffers corresponding to respective one of other input switching devices.

Furthermore, while the NoC system 100 is an example in which the technique of the present invention is applied to the mesh-type NoC system, the technique according to the present invention can be applied also to another NoC system that performs multi-inputs and multi-outputs of packets in the similar way, e.g., a tree-type NoC system.

While the invention has been described in terms of the embodiment, those skilled in the art will recognize that the invention can be practiced with various modifications within the spirit and scope of the appended claims and the invention is not limited to the examples described above.

Further, the scope of the claims is not limited by the embodiment described above.

Furthermore, it is noted that, Applicant's intent is to encompass equivalents of all claim elements, even if amended later during prosecution.

What is claimed is:

1. A NoC (Network on Chip) system comprising a plurality of NoC routers that perform transfer of a flit, wherein
each of the NoC routers is directly connected to a plurality of functional blocks, the functional blocks being NoC routers other than the NoC router or an Intellectual Property (IP),
at least one NoC router is a specific router including an input switching device provided between the NoC router and the plurality of functional blocks directly connected to the NoC router,
the specific router comprises:
a plurality of first buffers that temporarily store flits from the input switching device; and
a congestion degree notification unit that outputs congestion degree information indicating each free space of the plurality of first buffers provided in the specific router itself to the input switching device corresponding to the specific router, and
the input switching device comprises:
a plurality of second buffers that correspond to the respective one of the plurality of functional blocks, and temporarily store the flits from the functional blocks,
a controller that selectively sets one of the plurality of first buffers as an output destination of the flits stored in the plurality of second buffers based on the congestion degree information from the congestion degree notification unit in the specific router;
wherein the controller sets the output destination of a head flit stored in the second buffer, thereafter fixes an output destination of following flits to a tail flit corresponding to the head flit stored in the second buffer to the output destination set for the head flit.

2. The NoC system according to claim 1, wherein
the controller sets a first buffer having a free space equal to or larger than a first threshold value as the output destination when a determination condition is satisfied, the determination condition being whether there is a first buffer having the free space equal to or larger than the first threshold value among the plurality of first buffers in the specific router.

3. The NoC system according to claim 2, wherein
another specific router is included in the plurality of functional blocks directly connected to the specific router,
the input switching devices of the specific routers are connected each other,
the controller in the input switching device sets, when the determination condition is not satisfied, another input switching device connected to the input switching device as the output destination of the flits stored in the plurality of second buffers of the input switching device, and outputs the flits to the another input switching device.

4. The NoC system according to claim 3, wherein
when the determination condition is not satisfied, the controller in the input switching device outputs a rejection signal indicating that the controller does not receive any input of the flits to the another input switching device, and sets the input switching device as the output destination under a condition that the another input switching device does not output the rejection signal.

5. The NoC system according to claim 2, wherein
when there are a plurality of the first buffers having a free space equal to or larger than the first threshold value in the specific router corresponding to the input switching device, the controller in the input switching device sets a first buffer having the largest free space among the plurality of first buffers as the output destination.

6. The NoC system according to claim 2, wherein
the controller in the input switching device sets the determination condition that there is another first buffer having a free space equal to or larger than a second threshold value and equal to or smaller than the first threshold value other than a first buffer having a free space equal to or larger than the first threshold value among the plurality of first buffers of the specific router corresponding to the input switching device.

7. A NoC (Network on Chip) router connected to a plurality of function blocks via an input switching device in a NoC system, the NoC router comprises:
   a plurality of first buffers that temporarily store flits from the input switching device; and
   a transfer unit that transfers the flits temporarily stored in the plurality of first buffers to a functional block which is a transfer destination of the flits among the plurality of functional blocks; and
   a congestion degree notification unit that outputs congestion degree information indicating each free space of the plurality of first buffers provided in the NoC router itself to the input switching device corresponding to the NoC router;
   wherein the input switching device comprises:
   a plurality of second buffers that correspond to the respective one of the plurality of functional blocks, and temporarily store the flits from the functional blocks,
   a controller that selectively sets one of the plurality of first buffers as an output destination of the flits stored in the plurality of second buffers based on the congestion degree information from the congestion degree notification unit in the NoC router;
   wherein
   the controller sets the output destination of a head flit stored in the second buffer, thereafter fixes an output destination of following flits to a tail flit corresponding to the head flit stored in the second buffer to the output destination set for the head flit.

8. The NoC router according to claim 7, wherein
each of the plurality of first buffers includes a plurality of stages, and has a structure in which one flit is stored for one stage, and
the congestion degree information is information indicating the number of stages having space of each of the plurality of first buffers.

9. The NoC router according to claim 7, wherein
the controller sets a first buffer having a free space equal to or larger than a first threshold value as the output destination when a determination condition is satisfied, the determination condition being whether there is a first buffer having the free space equal to or larger than the first threshold value among the plurality of first buffers in the NoC router.

10. The NoC router according to claim 9, wherein
when there are a plurality of the first buffers having a free space equal to or larger than the first threshold value in the NoC router corresponding to the input switching device, the controller in the input switching device sets a first buffer having the largest free space among the plurality of first buffers as the output destination.

11. The NoC router according to claim 9, wherein
the controller in the input switching device sets the determination condition that there is another first buffer having a free space equal to or larger than a second threshold value and equal to or smaller than the first threshold value other than a first buffer having a free space equal to or larger than the first threshold value among the plurality of first buffers of the NoC router corresponding to the input switching device.

* * * * *